United States Patent Office 3,636,054
Patented Jan. 18, 1972

3,636,054
(4,4-DIALKOXY-2,5-CYCLOHEXADIENYLIDENE) MALONONITRILES
Brian R. O'Connor, Wilmington, Del., assignor to E. I. du Pont de Nemours and Company, Wilmington, Del.
No Drawing. Filed Sept. 25, 1968, Ser. No. 762,605
Int. Cl. C07d 13/04, 15/04
U.S. Cl. 260—340.7    3 Claims

ABSTRACT OF THE DISCLOSURE

Described and claimed are the novel (4,4-dialkoxy-2,5-cyclohexadienylidene)malononitriles and their derivatives of the formula

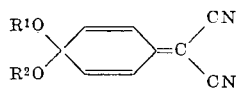

wherein $R^1$ and $R^2$ together are alkylene of 2–3 carbon atoms.

The compounds of this invention are useful as foliar fungicides.

BACKGROUND OF THE INVENTION (1) Field of the invention

This invention relates to certain (4,4-dialkoxy-2,5-cyclohexadienylidene)malononitriles and selected derivatives thereof useful as foliar fungicides.

(2) Description of the prior art

As far as is known the compounds of the present invention are new. The following prior art reference is of interest, however, in connection with this invention:

U.S. Pat. 3,115,506, Dec. 24, 1963, to Acker and Blomstrom entitled Derivatives of 1,4-Bismethylene Cyclohexane and 1,4-Bismethylene Cyclohexadiene and Processes of Preparation and assigned to E. I. du Pont de Nemours and Company.

This reference discloses the following selected mono- and diether condensation products of 7,7,8,8-tetracyano-p-quinodimethan, useful as active ingredients in thermographic copying papers:

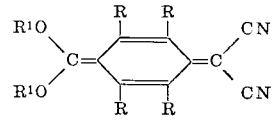

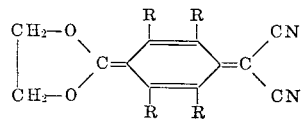

and

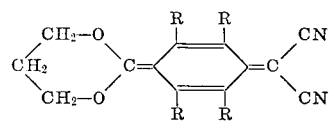

where R is hydrogen or alkyl. These compounds differ from those of the present invention in the presence of a substituted exocyclic methylene function at both the 1- and 4-positions of the cyclohexadiene nucleus.

SUMMARY AND DETAILS OF THE INVENTION

The new compounds of this invention are (4,4-dialkoxy-2,5-cyclohexadienylidene)malononitriles and selected derivatives thereof having the formula

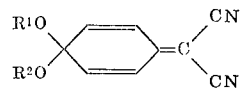

wherein $R^1$ and $R^2$ together are alkylene of 2–3 carbon atoms.

The new compounds of this invention are obtained by reaction of a benzoquinone monoketal with malononitrile according to the equation

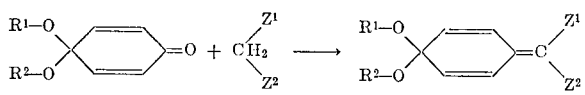

where $R^1$ and $R^2$ are as previously defined. This reaction generally proceeds more rapidly in the presence of added catalysts having basic nitrogen including aminoacids such as β-alanine; ammonium carboxylates such as ammonium acetate; and tertiary amines such as pyridine, triethylamine and triethanolamine.

The reaction is carried out in the presence of a nonreactive diluent or solvent. Although water can be used with advantage when an ionic catalyst is employed for the reaction of malononitrile with benzoquinone monoketals, anhydrous conditions are also useful. Illustrative of the latter is the use of an aromatic hydrocarbon such as benzene which permits the azeotropic removal of water formed during the reaction. Other solvents such as dimethyl sulfoxide, tetramethylene sulfone, dibutyl ether, etc. are also useful. Temperatures of 0–100° C. and preferably 20–50 are employed. Pressures can vary from subatmospheric to superatmospheric with atmospheric generally preferred. The preparation of specific compounds of this invention is more completely detailed in the following nonlimiting examples in which all temperatures are expressed in degrees centigrated.

EMBODIMENTS OF THE INVENTION

EXAMPLE 4,4-ethylenedioxy-2,5-cyclohexadiene-$\Delta^{1,\alpha}$-malononitrile
(1-4-dioxaspiro[4.5]deca-6,9-diene-$\Delta^{8A}$-8-malononitrile)

(A) 1,4,9,12-tetroxadispiro[4.2.4.2]tetradeca-6,13-diene

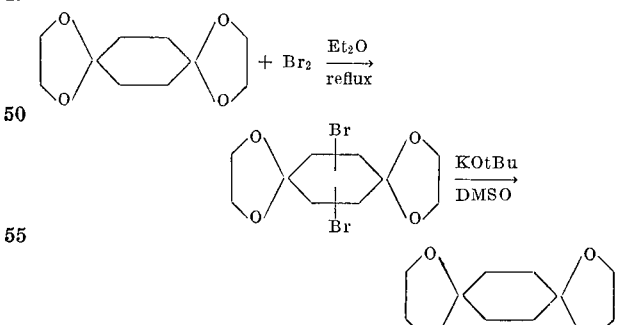

This reaction was run in a 3 l. three-necked flask fitted with a mechanical stirrer, a 100 ml. dropping funnel and a reflux condenser. A slow stream of nitrogen was passed through the system to sweep out hydrogen bromide. To a solution of 172 g. of the bis(ethylene)ketal of 1,4-cyclohexanedione (P. Courtot, Bull. Soc. Chim. France, 1962, 1493) in 1600 ml. of ether was added 270 g. of bromine at a rate sufficient to maintain gentle reflux. The bromine color was discharged rapidly, hydrogen bromide fumes were evolved and a white solid gradually formed. The crude reaction mixture was poured into a slurry of 450 g. of sodium carbonate in 1 l. of hexane and stirred until no more fumes were present. Water (1 l.) was added to dissolve the inorganic salts, and the crude intermediate dibromide was collected. After being washed thoroughly with water and hexane and dried in vacuo over phosphorus pentoxide, it weighed 210 g., M.P. 140–150° (gas). The crude dibromide was used without purification in the next step.

An analytical sample of the dibromide, obtained by crystallizing 2.0 g. of the crude product from 50 ml. of 50:50 benzene-hexane, had M.P. 152–154° (dec., gas) and was assigned the structure of an isomer of 1,4,9,12-tetroxadispiro[4.2.4.2]tetradeca-6,12-dibromide.

*Analysis.*—Calcd. for $C_{10}H_{14}Br_2O_4$ (percent): C, 33.55; H, 3.91; Br, 44.65. Found (percent): C, 33.81; H, 4.03; Br, 44.47.

IR (KBr) no bands between 1500–2800 cm.$^{-1}$.

NMR (CDCl$_3$) at 60 megacycles, $\delta$=4.25 (m., 10), 2.51 (s., 2), 2.40 (s., 1) and 2.35 p.p.m. (s., 1); at 100 megacycles, $\delta$=3.9 to 4.4 (m., 10), 2.39 (s., 2), 2.31 (s., 1) and 2.28 p.p.m. (s., 1); upon double irradition at 418 c.p.s. the high field protons appeared as singles of equal intensity at 237 and 232.5 c.p.s.; mass spec. (direct injection) 275 and 277 (p-Br).

The crude dibromide (208 g.) was slurried in 1300 ml. of dimethyl sulfoxide (dried over Linde 5a molecular sieves) and five 35 g. portions of potassium t-butoxide. The temperature rose to 50–60°, and the mixture became dark brown. It was stirred for 90 more minutes, then poured into 1 l. of a saturated sodium chloride solution. The crude product was collected, washed thoroughly with water, sucked dry and then crystallized from 1200 ml. of benzene after treatment with decolorizing charcoal. Pure 1,4,9,12-tetroxadispiro[4.2.4.2]tetradeca-6,13-diene was obtained as 43 g. of a white crystalline solid, M.P. 232–233.5°. Concentration of the mother liquor yielded 31 g. of a second crop, M.P. 232–234°, (total overall yield, 45%).

IR (KBr), 3000 (sh.), 2995 (w.), 2905 (m.), 1480 (w.), 1420 (m.), 1305 (m.), 1140 (s.), 1120 (s.), 1075 (m.), 1025 (s.), 975 (s.), 960 (s.), 940 (s.), and 770 cm.$^{-1}$ (m.);

NMR (CDCl$_3$), $\delta$=5.98 (s., —) and 4.10 p.p.m. (s., 8);

Raman (CHCl$_3$), 2890, 1670, 1330, 1110, 995, 965, and 935 cm.$^{-1}$; UV (CH$_3$CN) end absorption; mass. spec. (direct injection) m/e 196;

*Analysis.*—Calcd. for $C_{10}H_{12}O_4$ (percent): C, 61.22; H, 6.16. Found (percent): C, 61.16; H, 6.18.

MW, Calcd.: 196.2. Found: 204 (B.P. in CHCl$_3$)

The quinone bis(ethylene)ketal could be sublimed unchanged at 230° (760 mm.).

(B) 1,4-dioxaspiro[4.5]deca-6,9-diene-8-one

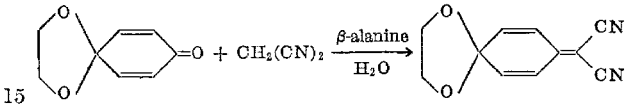

A solution of 5 g. of p-benzoquinone bis(ethylene)-ketal in 100 ml. of reagent acetone containing a few crystals of toluenesulfonic acid was stirred for 2½ hrs. at 25°, then poured into 100 ml. of water. The product was extracted with three 100 ml. portions of methylene chloride and obtained as 3.8 g. of pale yellows solid after evaporation of the solvent. Crystallization from 100 ml. of 9:1 hexane-benzene followed by sublimation at 50° (0.25 mm.) yielded pure 1,4-dioxaspiro[4.5]deca-6,9-diene-8-one [also named as benzoquinone mono(ethylene)ketal] as pale yellow crystals, M.P. 52–54°.

IR (CHCl$_3$), 3040 (m.), 2900 (m.), 1690 (sh.), 1680 (m.), 1635 (s.), 1385 (m.), 1305 (m.), 1180 (s.), 1115 (s.), 1068 (m.), 1015 (s.), 973 (s.), 945 (m.), and 852 cm.$^{-1}$ (m.);

NMR (CDCl$_3$), A$_2$B$_2$ pattern with singles at $\delta$=6.78, 6.61, 6.23 and 6.08 (total 4H), and $\delta$=4.13 p.p.m. (s., 4); UV max (iso) 213 m$\mu$ ($\epsilon$ 17,500), 248 (1450), 368 (14); (EtOH) 216 (14,700), 259 (780), and 335 (14);

*Analysis.*—Calcd. for $C_8H_8O_3$ (percent): C, 63.16; H, 5.31. Found (percent): C, 63.14; H, 5.32.

(C) 1,4-dioxaspiro[4.5]deca-6,9-diene-$\Delta^{8A}$-8-malononitrile

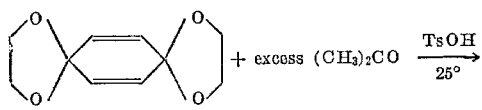

Benzoquinone mono(ethylene)ketal (20 g.) was slurried with 8 g. of malononitrile and 0.1 g. of $\beta$-alanine in 200 ml. of distilled water and stirred at 25° for six hours. The crude product was collected, giving 19 g. of a yellow solid. Two crystallizations from 50:50 hexane-benzene (solutions treated with decolorizing charcoal) yielded pure 1,4-dioxaspiro[4.5]deca - 6,9 - diene-$\Delta^{8A}$-8-malononitrile as pale yellow plates, M.P. 145–146.5°;

IR (KBr), 3070 (w.), 3000 (w.), 2900 (w.), 2235 (m.), 1650 (w.), 1590 (m.), 1540 (m.), 1218 (s.), 1110 (s.), 1015 (s.), 965 (sh.), and 820 cm.$^{-1}$.

NMR (CDCl$_3$), A$_2$B$_2$ pattern with singlets at $\delta$=6.95, 6.80, 6.50 and 6.23 p.p.m. (4H), $\delta$=4.13 (s., 4).

UV max (CH$_3$), 298 m$\mu$ ($\epsilon$ 24,600).

*Analysis.*—Calcd. for $C_{11}H_8N_2O_2$ (percent): C, 66.00; H, 4.03; N, 14.00. Found (percent): C, 66.11; H, 3.86; N, 13.99.

When the procedure of Example 1 is followed except that p-benzoquinone bis(trimethylene)ketal is used, there results 4,4-trimethylenedioxy - 2,5 - cyclohexadiene-$\Delta^{1,\alpha}$-malononitrile, i.e.,

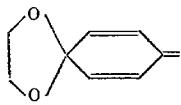

EXAMPLE A

The compounds of this invention are useful as foliar fungicides. The effectiveness of the compound of Example 1 against late tomato blight fungus was proven by application of the compound in an aqueous medium to tomato foliage. The compound at a concentration of 0.04% completely protected the foliage. At 0.008% about 88% of the foliage was protected.

The same compound when tested at concentrations of 0.01–0.002% gave substantially complete protection against apple scab on apple foliage.

The embodiments of the invention in which an exclusive property or privilege is claimed are defined as follows:

1. A compound of the formula

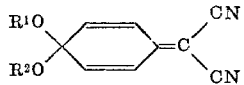

wherein R$^1$ and R$^2$, together, are alkylene of 2–3 carbon atoms.

2. The compound of claim 1 wherein R$^1$ and R$^2$ together are —CH$_2$CH$_2$—, 4,4-ethylenedioxy-2,5-cyclohexadiene-$\Delta^{1,\alpha}$-malononitrile.

3. The compound of claim 1 wherein R$^1$ and R$^2$ together are —CH$_2$CH$_2$CH$_2$—, 4,4-trimethylenedioxy-2,5-cyclohexadiene-$\Delta^{1,\alpha}$-malononitrile.

No references cited.

ALEX MAZEL, Primary Examiner

J. H. TURNIPSEED, Assistant Examiner

U.S. Cl. X.R.

260—340.9, 464; 424—278